United States Patent
Deobald (10) Patent No.: US 7,634,689 B2
(45) Date of Patent: Dec. 15, 2009

(54) BOOT PERFORMANCE OPTIMIZATION FOR HARD DRIVE FOR PERSONAL INTERNET COMMUNICATOR

(75) Inventor: Martyn G. Deobald, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 514 days.

(21) Appl. No.: 11/234,637

(22) Filed: Sep. 22, 2005

(65) Prior Publication Data

US 2007/0067679 A1    Mar. 22, 2007

(51) Int. Cl.
G06F 11/00    (2006.01)
(52) U.S. Cl. .............................. 714/36; 714/2
(58) Field of Classification Search ............. 714/36
See application file for complete search history.

(56) References Cited

U.S. PATENT DOCUMENTS

| | | | | |
|---|---|---|---|---|
| 5,651,139 A | | 7/1997 | Cripe et al. ................ 395/490 |
| 5,715,456 A | * | 2/1998 | Bennett et al. ................ 713/2 |
| 5,974,517 A | | 10/1999 | Gaudet ...................... 711/173 |
| 6,434,696 B1 | * | 8/2002 | Kang ........................... 713/2 |
| 6,657,562 B2 | * | 12/2003 | Radermacher et al. ........ 341/50 |
| 6,832,317 B1 | | 12/2004 | Strongin et al. ............. 713/182 |
| 6,920,533 B2 | * | 7/2005 | Coulson et al. ............. 711/145 |
| 2004/0034765 A1 | * | 2/2004 | James ............................ 713/1 |
| 2004/0215953 A1 | * | 10/2004 | Cantwell et al. ............... 713/2 |
| 2005/0125407 A1 | * | 6/2005 | Kraus et al. .................... 707/8 |
| 2005/0216895 A1 | * | 9/2005 | Tran ........................... 717/127 |
| 2005/0289382 A1 | * | 12/2005 | Lee ............................... 714/2 |

FOREIGN PATENT DOCUMENTS

WO    WO2005/013125    2/2005
WO    WO2005/029325    3/2005

OTHER PUBLICATIONS

AMD Geode GX 533@1.1W Processor* Technical Specs, http://www.amd.com/us-en/ConnectivitySolutions/ProductInformation/0,,50_2330_9863_9864,00.html, printed Oct. 6, 2005 (1 page).
"AMD Personal Internet Communication (PIC)—Specification," http://www.amdboard.com/pic.html, printed Oct. 6, 2005 (6 pages).
International Search Report and Written Opinion of the International Searching Authority for PCT/US2006/032754, dated Jan. 29, 2007.

* cited by examiner

Primary Examiner—Scott Baderman
Assistant Examiner—Kamini Patel
(74) Attorney, Agent, or Firm—Hamilton & Terrile, LLP; Michael Rocco Cannatti (57) ABSTRACT

In a personal Internet communication device, an optimized operating system image (NK.bin) is constructed from the operating system component files required to provide a minimum threshold of operating system functionality. By reducing the size of the operating system image, the time required to load the operating system is reduced.

4 Claims, 5 Drawing Sheets

BOOT PERFORMANCE OPTIMIZATION FOR HARD DRIVE FOR PERSONAL INTERNET COMMUNICATOR

BACKGROUND OF THE INVENTION

1. Field of the Invention

The present invention relates to the field of information processing systems. In one aspect, the present invention relates to a system and method for booting an operating system image into memory.

2. Description of the Related Art

Computer systems have attained widespread use for providing information management capability to many segments of today's society. A personal computer system can usually be defined as a microcomputer that includes a system unit having a system processor and associated volatile and non-volatile memory, a display monitor, a keyboard, a fixed disk storage device, an optional removable storage device and an optional printer. These personal computer systems are information processing systems which are designed primarily to give independent computing power to a single user (or a group of users in the case of personal computers which serve as computer server systems) and are inexpensively priced for purchase by individuals or small businesses.

In recent years, there has been significant growth in the use of the personal computers and/or computer appliances to exchange information over the Internet. This exchange of information is based on a client/server model with the user's personal computer/appliance operating as the client to access data stored on a plurality of Internet servers. Some Internet service providers provide a computer or appliance to a user as part of a contractual relationship to provide Internet service. As part of the relationship, the Internet service provider typically provides the computer/appliance with an operating system ("OS") or embedded OS that is loaded into memory from an OS image file. The OS image file is initially stored in a non-volatile storage device (such as flash, ROM or hard disk), and during startup, a Basic Input Output System (BIOS) or a bootloader initiates a boot cycle which loads the OS into memory from the OS image file stored in the non-volatile storage device. Because of delays associated with locating and retrieving the OS image from non-volatile storage devices, delays can occur in the OS loading operation, especially as operating systems become more complex and include additional files and functionality.

Consequently, there is a need for a boot load apparatus, system and methodology that reduces or minimizes the time required to boot the personal computer operating system. In addition, a significant need exists for an efficiently-loaded operating system for use with computers, such as those used as personal Internet communicators (PICs) over a communication network provided by an Internet service provider. Further limitations and disadvantages of conventional systems will become apparent to one of skill in the art after reviewing the remainder of the present application with reference to the drawings and detailed description which follow.

SUMMARY OF THE INVENTION

The method and apparatus of the present invention provide an efficiently loaded operating system by storing an initial or partial image of the operating system (e.g., NK.bin) that includes the files that are necessary to load and run the desktop function during the boot cycle, while unnecessary files are subsequently loaded outside of the boot cycle. The size of the partial image file may be further reduced by compressing the image file. By making the initial OS image file as small as possible, the time needed to boot the system is minimized.

In accordance with various illustrative embodiments of the present invention, a method and system are disclosed for generating an operating system image file having reduced storage requirements which improves the download or loading time required to boot up at least part of the operating system. As a preliminary step, a debug image is built of a first operating system having full operating system functionality. While the debug image build occurs, the debug output is recorded to identify a first subset of operating system files that are loaded when a predetermined minimum threshold of operating system functionality is obtained. The identified first subset of operating system files are assembled into a reduced operating system image file, which may be stored in non-volatile memory for loading during bootup. As for the operating system files not included in the first subset of operating system files, they are stored in another predetermined location in non-volatile memory. The sequence of steps may be iteratively repeated to refine the first subset of operating system files. For example, a debug image of the reduced operating system image file may be built while recording debug output to identify a first refined subset of operating system files that are loaded when the predetermined minimum threshold of operating system functionality is obtained. The identified first refined subset of operating system files may then be assembled into a reduced operating system image file.

The objects, advantages and other novel features of the present invention will be apparent to those skilled in the art from the following detailed description when read in conjunction with the appended claims and accompanying drawings.

DETAILED DESCRIPTION

While illustrative embodiments of the present invention are described below, it will be appreciated that the present invention may be practiced without the specified details, and that numerous implementation-specific decisions may be made to the invention described herein to achieve the developer's specific goals, such as compliance with system-related and business-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid obscuring or unduly limiting the present invention. Such descriptions and representations are used by those skilled in the art to describe and convey the substance of their work to others skilled in the art. The present invention will now be described with reference to the drawings described below.

Figure 1:
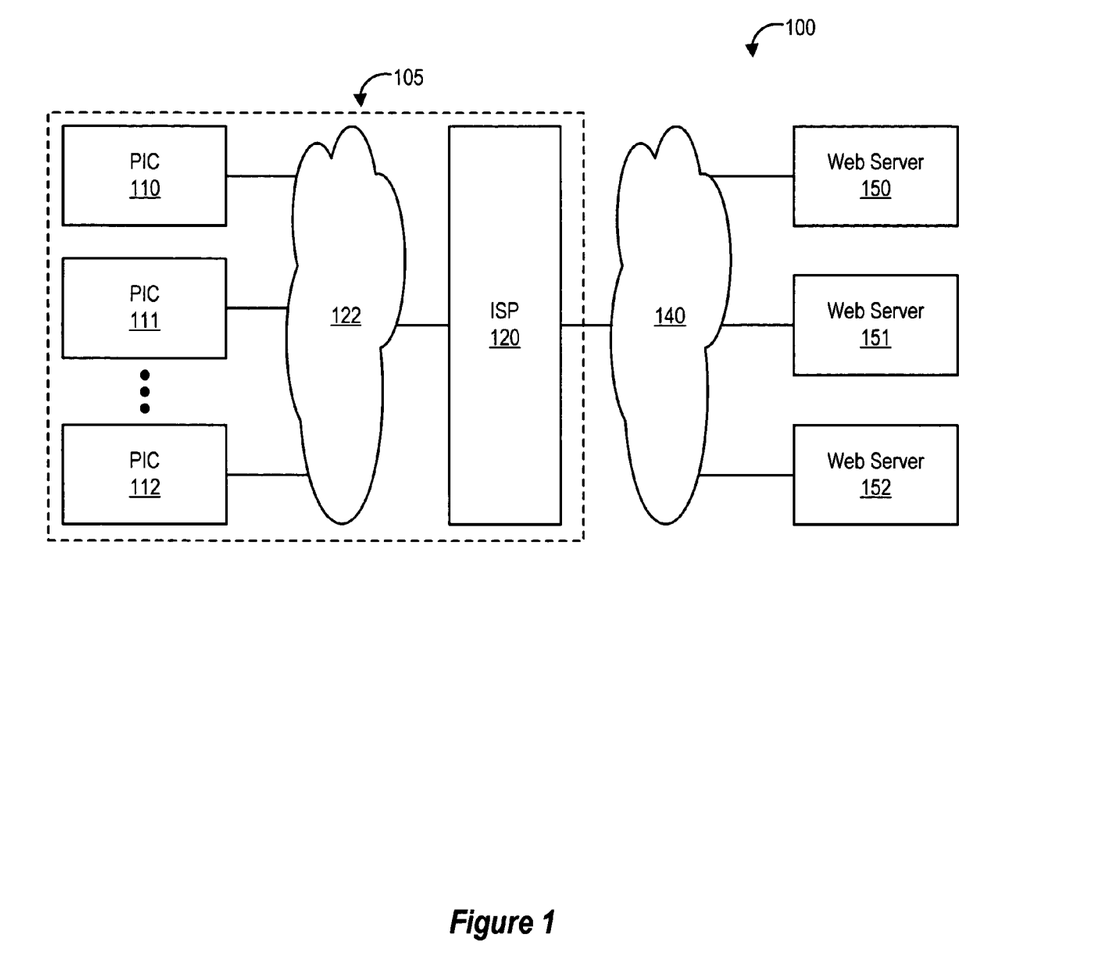
FIG. 1 is a block diagram of a plurality of computer systems communicating over one or more communication networks.

Referring to FIG. 1, a block diagram of an exemplary network 100 is shown wherein a plurality 105 of computer systems 110, 111, 112 communicates over one or more communication networks 140. As illustrated, each computer system (e.g., 110)—also referred to as multimedia access devices or personal Internet communicators (PICs)—is operably coupled to an Internet service provider (ISP) 120 via one or more communication links 122. The Internet service provider 120 is coupled to the Internet 140 that is further coupled to a plurality of Web host servers 150, 151, 152. A user wishing to access information on the Internet uses a PIC (e.g., 110) to execute an application program stored on the PIC known as a Web browser.

The PIC 110 includes communication hardware and software that allows the PIC 110 to send and receive communications to and from the Internet service provider 120. The communications hardware and software allows the PIC 110 to establish a communication link with the Internet service provider 120. The communication link may be any of a variety of connection types including a wired connection, a direct link such as a digital subscriber line (DSL), T1, integrated services digital network (ISDN) or cable connection, a wireless connection via a cellular or satellite network, phone modem dialup access or a local data transport system, such as Ethernet or token ring over a local area network.

When the customer enters a request for information by entering commands in the Web browser, the PIC 110 sends a request for information—such as a search for documents pertaining to a specified topic or a specific Web page—to the Internet service provider 120 which in turn forwards the request to an appropriate Web host server 150 via the Internet 140. The Internet service provider 120 executes software for receiving and reading requests sent from the browser. The Internet service provider 120 executes a Web server application program that monitors requests, services requests for the information on that particular Web server, and transmits the information to the user's PIC 110.

Each Web host server 150, 151, 152 on the Internet has a known address that the user supplies to the Web browser to connect to the appropriate Web host server. If the information is not available on the user's Web host server 150, the Internet 140 serves as a central link that allows Web servers 150, 151, 152 to communicate with one another to supply the requested information. Because Web servers 150, 151, 152 can contain more than one Web page, the user will also specify in the address which particular Web page he wants to view. The address, also known as a universal resource locator (URL), of a home page on a server is a series of numbers that indicate the server and the location of the page on the server, analogous to a post office address. For simplicity, a domain name system was developed that allows users to specify servers and documents using names instead of numbers. A URL may further specify a particular page in a group of pages belonging to a content provider by including additional information at the end of a domain name.

Figure 2:
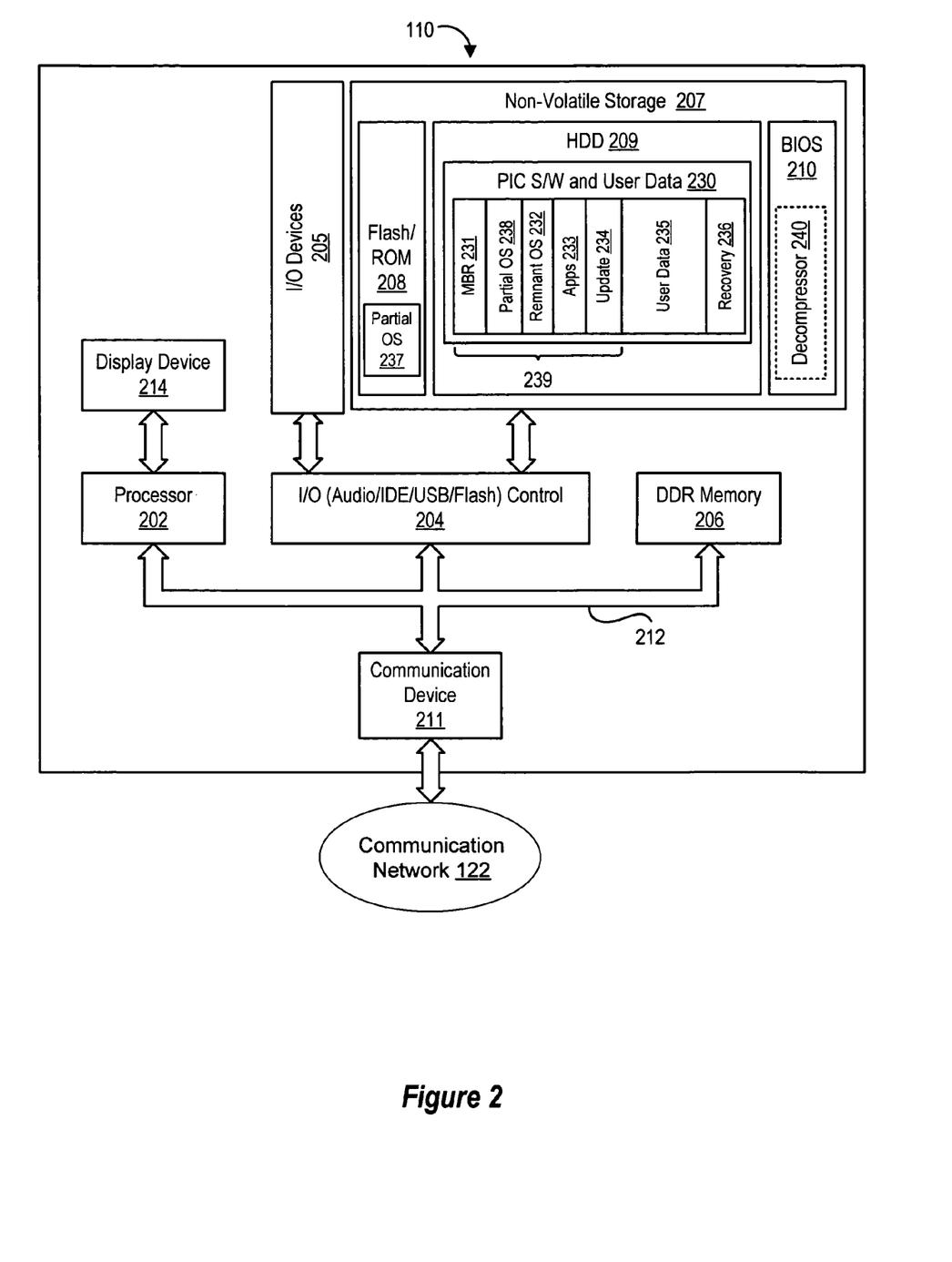
FIG. 2 is a system block diagram of a computer system, such as a personal Internet communicator, in accordance with various embodiments of the present invention.

Referring to FIG. 2, a block diagram of PIC 110 is shown. The PIC 110 includes a processor 202, input/output (I/O) control device 204, memory (including volatile random access memory (RAM) memory 206 and non-volatile memory 207), communication device 211 (such as a modem) and a display 214. The processor 202, I/O controller 204, memory 206 and communication device 211 are interconnected via one or more buses 212. In a selected embodiment, the processor 202 is implemented as an AMD Geode GX 32-bit x86 compatible processor, the memory 206 is implemented as a 128 MB DDR memory and the display 214 is implemented as a CRT monitor. In addition, the non-volatile memory 207 may include a hard disk drive 209 that is implemented as an integrated 3.5 inch hard disk drive with a minimum capacity (e.g., 10 GB). Either or both of the memories 206, 207 may be integrated with or external to the PIC 110. As for the communication device 211, an integrated 56K ITU v. 92 Modem with an external connector may be used to support different phone systems throughout the world, though other modems (e.g., a soft modem) may also be used. Of course, it will be appreciated that other device configurations may also be used for the processor 202, memory 206, 207, display 214 and communication device 211. For clarity and ease of understanding, not all of the elements making up the PIC 110 are described in detail. Such details are well known to those of ordinary skill in the art, and may vary based on the particular computer vendor and microprocessor type. Moreover, the PIC 110 may include other buses, devices, and/or subsystems, depending on the implementation desired. For example, the PIC 110 may include caches, modems, parallel or serial interfaces, SCSI interfaces, network interface cards, and the like.

As illustrated in FIG. 2, the I/O control device 204 is coupled to I/O devices 205, such as one or more USB ports, a keyboard, a mouse, audio speakers, etc. The I/O control device 204 is also coupled to non-volatile storage 207, such as a flash memory or other read only memory (ROM) 208 and/or hard disk drive 209. The PIC 110 is depicted as being connected to communication network 122 and the Internet 140 by a communication device 211, such as a modem, but the connection may be established by any desired network communication device known to those of skill in the art. Though the processor 202 is shown as being coupled directly to a display device 214, the processor may also be coupled indirectly to the display 214 through a display or I/O controller device. Similarly, the processor is shown as being coupled through the I/O controller 204 to the non-volatile memory 207, though direct coupling is also contemplated.

Various programming codes and software are stored in the PIC memory. For example, the basic input/output system (BIOS) program code that starts the PIC 110 at startup may be stored in a BIOS ROM device 210 of the non-volatile storage 207. The non-volatile memory 207 also stores the bootloader program (e.g., in the Master Boot Record 231 portion of the hard drive 209) which loads and executes the operating system by retrieving and loading a series of loading mechanics or modules to retrieve the operating system image file from a non-volatile storage device and load the operating system image into a volatile storage device (e.g., RAM). As will be appreciated, the operating system load operations may be performed by the BIOS program code 210 and/or the bootloader in the MBR 231, either or both of which may be implemented as a boot load apparatus in the non-volatile storage 207. In various implementations, the non-volatile storage 207 may be implemented as a ROM (Read Only Memory) or a PROM (Programmable ROM) such as an EPROM (Erasable PROM), an EEPROM (Electrically Erasable PROM), a flash RAM (Random Access Memory) or any other type of memory appropriate for storing BIOS. Additional software and user data may also be stored on the hard drive 209 of the non-volatile storage 207 and executed and/or processed by processor 202. In a selected embodiment, the PIC software and user data 230 includes a master boot record (MBR) 231, an initial or partial OS image 238, the remnant operating system components 232 (described hereinbelow), an application program partition 233, a software update module 234, user data 235, and a hidden image recovery module 236. The applications 233 may include web browser, Flash player, presentation viewer for PowerPoint, chat, game, compression utility, e-mail, word processor, spreadsheet, PDF viewer, media player and/or drawing applications. In addition, the user data 235 stores all of the user's data so that a user has direct access to the user data. This user data 235 is protected from the rest of the operating system to prevent corruption of the data by a virus or other means. For example, a shell/lock filter module may be provided which interacts with any application that explores content within the PIC 110 to ensure that a user cannot delete protected or non-user content, such as the MBR 231, partial OS 238, remnant OS 232, applications 233 and update module 234. Alternatively, protected content may include all content stored within the system partition 239.

In operation, the BIOS program 210 starts by locating a master boot record (MBR) 231, which stores the configurable aspects of the bootstrap program. The MBR 231 is typically stored at a fixed location, such as the first sector of the hard drive disk 209 or CD-ROM. Upon executing the MBR program 231, the BIOS program 210 next checks for a boot loader program (or pointer thereto) in the MBR 231, and then executes the boot loader program to determine what operating system to load and where on the storage device to load it from. The boot loader program is programmed with the location on the non-volatile storage device of a kernel, which the boot loader then executes to complete loading of the operating system code. As the kernel is loaded, the BIOS program 210 transfers control to an initial address provided by the operating system kernel, and the operating system is loaded into RAM within the PIC 110. Once loaded and initialized, the operating system controls the execution of programs and may provide services such as resource allocation, scheduling, input/output control and data management. In a selected embodiment, the BIOS 210 and/or bootloader enable the PIC operating system to be an embedded closed operating system, such as a Windows CE type operating system, though any operating system (including but not limited to Windows-based and Linux-based Operating Systems) could be supported by the BIOS and bootloader program code.

To quickly and efficiently load the operating system, the PIC 110 is designed to load the operating system using an initial binary image that is an executable contained in the OS kernel and that has reduced content, as compared to a typical OS image having full operating system functionality. For example, with a personal computer that runs the WinCE operating system, a full OS image (NK.bin) would conventionally be stored on the hard drive, but the increasing size and complexity of such conventional OS image files increases the time required to load the operating system. This is addressed in a selected embodiment of the present invention by storing a reduced or partial OS image file on the PIC 110 that has been edited to remove unnecessary files, thereby reducing or minimizing the size of the BIN file that is actually installed. The NK.bin file may also optionally be compressed to further reduce its size.

An example of an initial binary image is the partial OS image file (237 or 238) illustrated in FIG. 2. In accordance with various embodiments of the present invention, the boot load apparatus, during startup, accesses the compressed and/or partial images 237 or 238 of the operating system that are stored in the non-volatile storage 207, such as the compact flash 208 or the hard disk 209. For example, when loading a Windows CE embedded operating system during startup, the boot load apparatus searches for a partial OS image (e.g., partial OS 238) that is stored as an NK.bin file in the non-volatile storage 207 (e.g. in a file directory of a hard disk drive 209). If the NK.bin file is not found in a first location, the boot load apparatus searches the rest of the non-volatile storage 207 or eventually determines that the OS load operation has failed. If the NK.bin file is found, a first cluster number is obtained from a File Allocation Table (FAT) and converted to a cylinder number, a head number, and a sector number so as to retrieve the file data from the hard disk drive 209 and transfer it to system RAM (e.g., DDR memory 206). If the partial OS image (e.g., 238) is stored as a compressed file, a decompressor 240 in the BIOS 210 can be used to decompress these software images and to store the decompressed files directly in their intended destinations.

By constructing the partial OS image file (e.g., 238) to include a kernel and only the files required to meet a predetermined minimum threshold of operating system functionality and then storing the partial OS image file as the NK.bin file, bootup time can be reduced. By accessing and loading the partial OS image file 238 (which is stored as an NK.bin file) during bootup, only part of the operating system for the PIC 110 is loaded. In an example implementation, the partial OS load operation succeeds in loading at least the desktop for the PIC 110. As additional or remnant components 232 of the operating system are subsequently needed, they are loaded from a predetermined directory on the main or system partition 239 (e.g., the C:/Windows directory) under control of the operating system which is configured by the partial OS image (NK.bin) to retrieve the remnant OS components 232 from the predetermined directory location. Thus, the initially installed partial OS image 238 is pre-configured with operating parameters that can affect the performance of the system, including specifying the location of remnant OS components 232 that are not initially loaded with the partial OS image 238.

Figure 3:
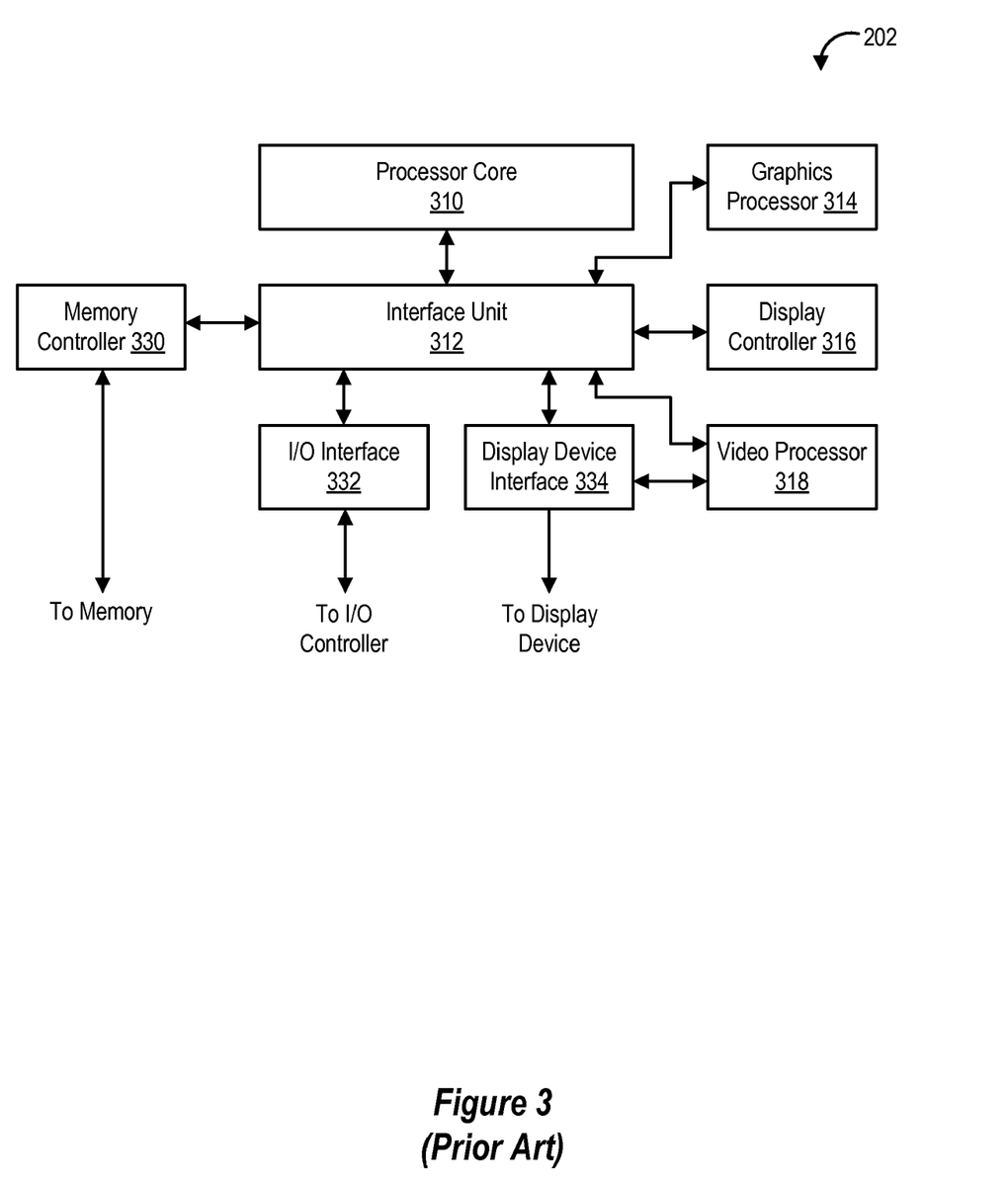
FIG. 3 shows a block diagram of a processor system for use in the personal Internet communicator.

Referring to FIG. 3, a block diagram of the processor 202 is shown. In one embodiment, the processor 202 is a Geode GX2 processor available from Advanced Micro Devices. The processor 202 includes a processor core 310, a bus or interface unit 312, a graphics processor 314, a display controller 316, and a video processor 318. The processor 202 also includes a memory controller 330, an I/O controller interface 332 and a display device interface 334, though it will be appreciated that these controllers and interfaces may be implemented externally to the processor 202. In the illustrated embodiment, the processor 202 executes software stored in the memory 206, 207 to load the partial OS image 237, 238 at bootup, and to subsequently load the remaining OS components 232 as needed.

Figure 4:
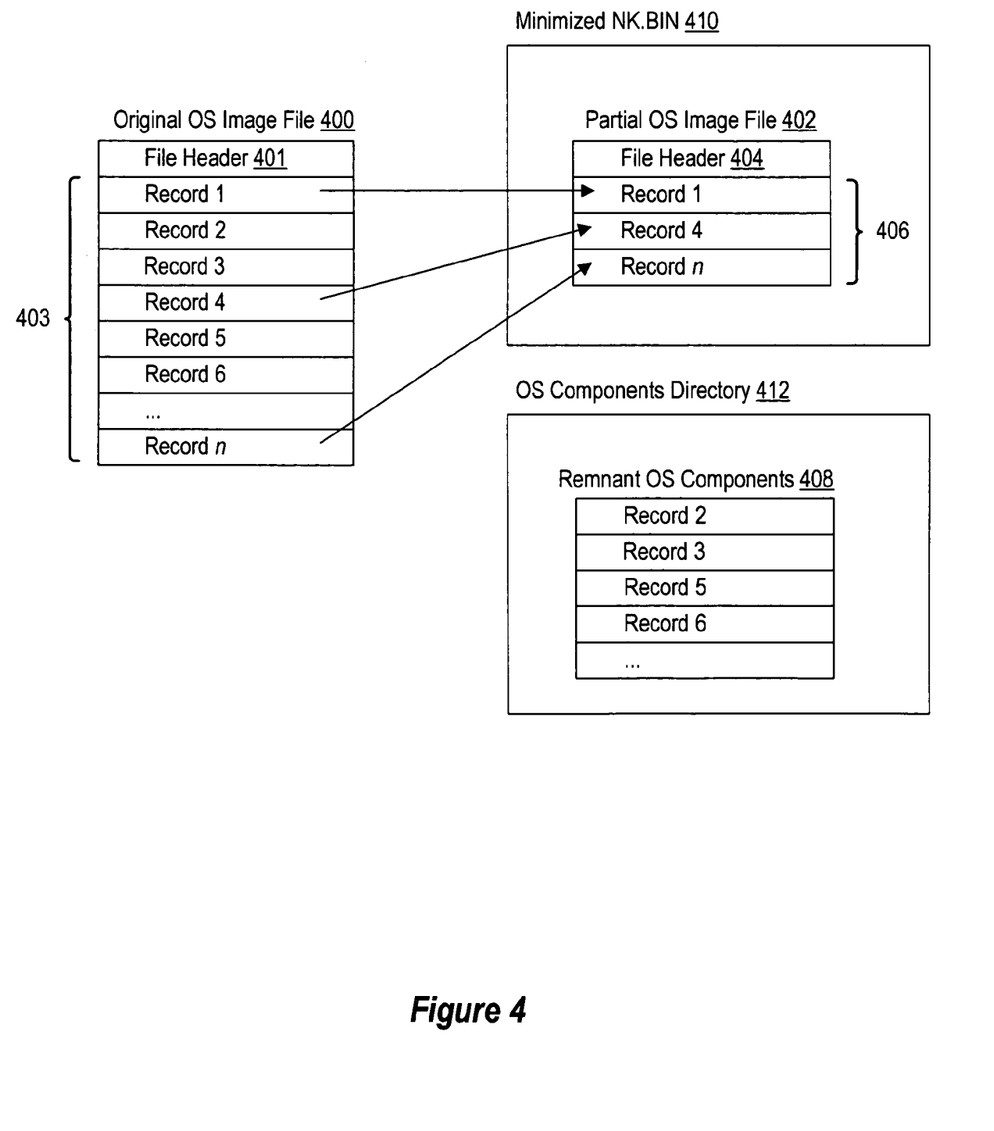
FIG. 4 illustrates an exemplary file structure of an original software image and a corresponding file structure for a partial software image in accordance with various embodiments of the present invention.

Referring to FIG. 4, there is illustrated an exemplary file structure of an original software image 400 and a corresponding file structure for a partial software image 402 as configured in accordance with various embodiments of the present invention. The structure of the original software image file 400 is used for many operating system images, such as the Windows CE operating system (OS), in which case the original OS file is stored the NK.bin file. As illustrated, the original OS image files 400 are stored in a single monolithic file which is formatted to include a file header (FH) 401 and one or more records 403 (Record 1, Record 2, . . . , Record n). The file header 401 contains a signature, the address at which the image starts to be loaded, and the total length of the image file. Each record in the file (Record 1, Record 2, . . . . Record n) includes a header followed by the record's data payload. The record header (RH) contains the destination address of the data, the length of the data, and a validation code, that may be a checksum, used to validate the contents of the record's data.

In accordance with the present invention, a partial OS image file 402 is formed by editing the original OS image file 400 (e.g., NK.bin) to remove unnecessary files for purposes of reducing or minimizing the size of the partial OS image file 402 that is actually installed. In a selected embodiment, the files that are edited or removed are those that are not required by the PIC 110 to obtain a predetermined minimum threshold of operating system functionality. In the illustrated example, the partial OS image file 402 file is structured as a file header 404 and a payload 406 of selected records (e.g., Record 1, Record 4 and Record n) which provide the threshold of operating system functionality. The file header 404 contains information relating to the destination where the payload file 406 is to be stored, while the payload 406 includes the records that are necessary to obtain a minimum threshold of operating system functionality (e.g., having the desktop loaded and running on the display). Any records not included in the partial OS image file 402 (e.g., Record 2, Record 3, Record 5, Record 6, etc.) may be stored as remnant OS components 408 (e.g., Remnant OS 232 in FIG. 2) that are loaded from a predetermined directory 412 (e.g., the C:/Windows directory) as needed. With a smaller OS image 402, the time required to transfer OS image files from one storage medium (Internet server, file server, hard drive, memory, etc.) to another is reduced.

A record-based compression mechanism may optionally be used to further reduce the media space required for storing the partial OS image file 402. In a selected embodiment, the header portion 404 of the partial OS file 402 is not compressed, but the payload 406 is compressed. The compressed image is decompressed by the decompressor 240 in the BIOS 210 as illustrated in FIG. 2. In this way, the header information 404 is used to directly place the payload 406 in the desired location, and the decompression of the payload 406 is conducted "on the fly" during the placement process. This technique reduces the boot time for the PIC, and significantly improves the boot performance. Further details concerning the compression of OS image files are described in U.S. patent application Ser. No. 11/172,509, entitled "Decompression Technique For Generating Software Image," filed Jun. 30, 2005, and assigned to Advanced Micro Devices, Inc., which is hereby incorporated by reference in its entirety as if fully set forth herein.

Figure 5:
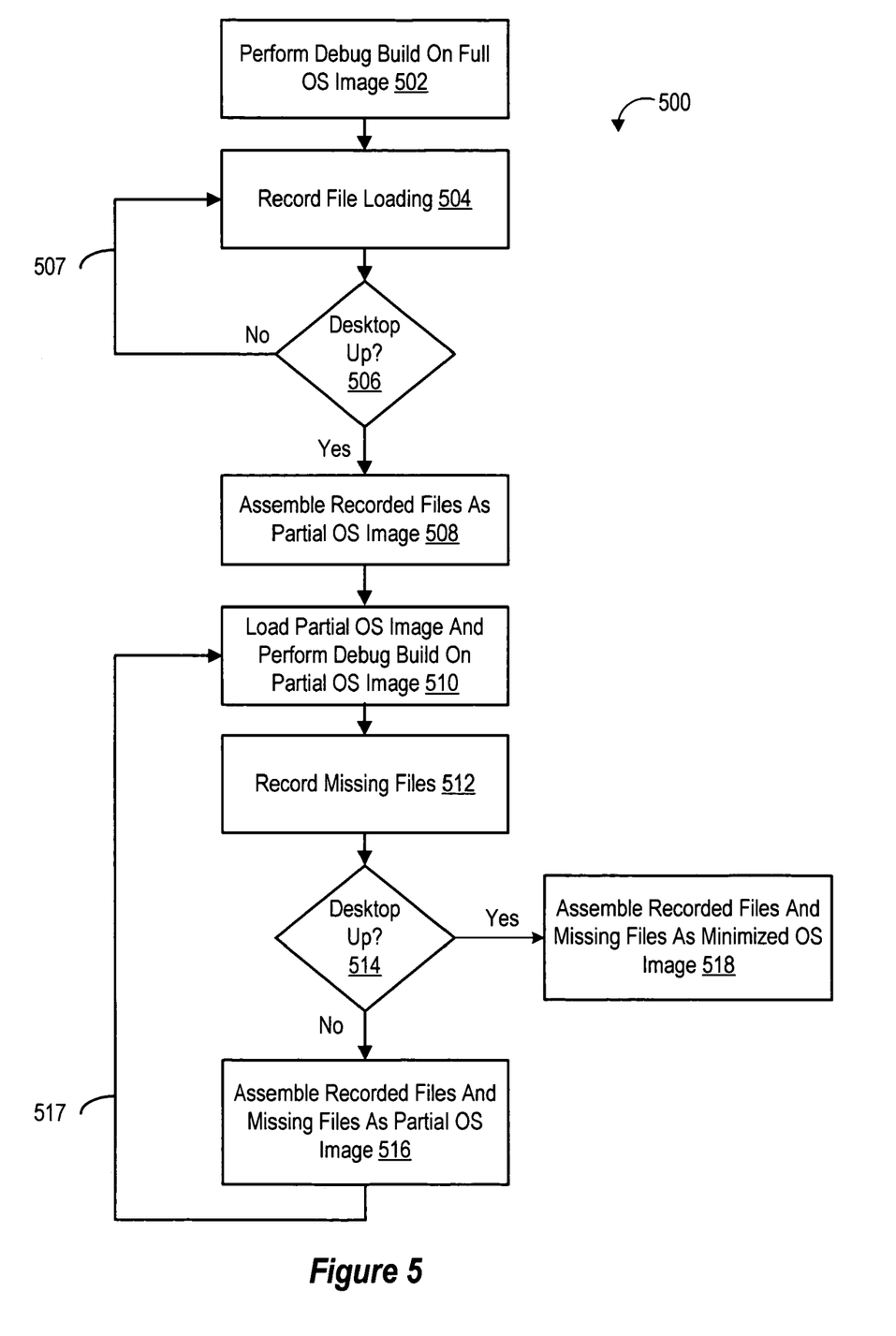
FIG. 5 is a flow chart describing an exemplary methodology for assembling a partial OS image that is optimized for boot performance.

Turning now to FIG. 5, a flow chart is shown describing an exemplary methodology 500 for assembling a partial OS image that is optimized for boot performance. It will be appreciated that the partial or compressed image file can be generated as a post-processing step once the original image had been generated by the operating system builder, and that the depicted methodology may be used to construct a partial or initial OS image that provides any desired minimum threshold of operating system functionality. However, for purposes of simplicity, the example of FIG. 5 is described with reference to defining the minimum OS image required to get the desktop function up and running.

As a preliminary step, the full OS image is obtained and debug build processing is performed on the full OS image at step 502. At this point, the size of a full OS image, such as used for Windows CE OS, is approximately 34 MB, including but not limited to registry files, device drivers (such as display and audio drivers) required for the host driver and the OS kernel.

Next, a debug build operation is performed so that the operational functionality of the computer may be monitored as the files being loaded from the full OS are recorded. While any desired debug build tool may be used, in a selected embodiment, the Microsoft Windows CE Platform Builder tool is used to build a debug image of the WinCE image file (NK.bin). Whatever debug build tool is used, the debug output is recorded at step 504 while the screen is observed at step 506 to detect when the predetermined minimum threshold of operating system functionality (e.g., having the desktop up and running on screen) is achieved. If the threshold functionality is not reached (negative outcome to decision 506), then the file loading continues to be recorded (as indicated at line 507). Once the threshold functionality is reached (affirmative outcome to decision 506), then the recorded files are assembled as the partial OS image (at step 508). In this process of assembling the recorded files into a reduced or modified image, the Platform Builder tool is used to iterate on modifications to the image while recording the debug output to ensure that the minimized image correctly boots. In this way, the partial OS image may be constructed to include only the files that are necessary to provide the predetermined minimum threshold of operating system functionality during the boot cycle, and any unnecessary files may be stored separately from the partial OS image file for subsequent loading outside of the boot cycle. By making the initial OS image file as small as possible, the time needed to boot the system is minimized.

While it is contemplated that the partial OS image may be constructed with a single debug build operation (such as described hereinabove), selected embodiments of the present invention may use one or more passes to achieve the desired result and obtain an optimized partial OS image file. For example, a manual debug build operation may be performed to obtain a first approximation of the partial OS image using steps 502-508, and then using an iterative process of repeating these steps to further refine the assembly of the partial OS image. In this implementation, the first approximation of the partial OS image assembled at step 508 may not include all files required to obtain the threshold functionality. To add the missing files, the first approximation of the partial OS image is loaded and a debug build operation is performed on the partial OS image at step 510. While the files being loaded from the partial OS image are recorded, the operation of the computer is observed on the computer's display screen. For example, the debug output is recorded at step 512 while the screen is observed at step 514 to detect when the desktop is up and running. If the predetermined minimum threshold of operating system functionality (e.g., having the desktop appear on screen) is not reached (negative outcome to decision 514), then any recorded missing files captured at step 512 are added to the partial OS image with the assembly step 516, and the iterative process is repeated (as indicated at line 517). Once the threshold functionality is reached (affirmative outcome to decision 514), then the recorded files and missing files are assembled as the minimized OS image (at step 518). All other remaining files from the full OS image may be stored as remnant OS component files on the hard drive for subsequent retrieval as needed outside of the boot cycle.

As will be appreciated, steps 510-517 may be repeated iteratively as required to obtain the desired or optimized level of functionality for the partial OS image and to reduce the size of the OS image. For example, in a first pass, the size of a full OS image, such as used for Windows CE OS, may be reduced from approximately 34 MB to approximately 12 MB, while additional iterative passes can further reduce the size of the OS image to approximately 8 MB.

The particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A method for generating an operating system image file having reduced storage requirements, comprising:
   building a debug image of a first operating system having full operating system functionality while recording debug output;
   monitoring the debug output to identify a first subset of operating system files that are loaded when a predetermined minimum threshold of operating system functionality is obtained; and
   assembling the identified first subset of operating system files into a reduced operating system image file.

2. The method of claim 1, further comprising storing the first subset of operating system files in non-volatile memory for loading during bootup.

3. The method of claim 1, further comprising storing a second subset of operating system files in non-volatile memory, where the second subset of operating system files includes any operating system files from the first operating system not included in the first subset of operating system files.

4. The method of claim 1, further comprising:
   building a debug image of the reduced operating system image file while recording debug output;
   monitoring the debug output for the reduced operating system image file to identify a first refined subset of operating system files that are loaded when the predetermined minimum threshold of operating system functionality is obtained; and
   assembling the identified first refined subset of operating system files into a reduced operating system image file.

\* \* \* \* \*